United States Patent [19]

Lu

[11] 4,394,468

[45] Jul. 19, 1983

[54] FIBER REINFORCED POLYOXYMETHYLENE MOLDING COMPOSITIONS

[75] Inventor: Shau-Zou Lu, Whitehouse Station, N.J.

[73] Assignee: Celanese Corporation, New York, N.Y.

[21] Appl. No.: 345,287

[22] Filed: Feb. 3, 1982

[51] Int. Cl.³ .......................... C08L 71/02; C08F 3/40; C08J 3/20
[52] U.S. Cl. ..................................... 523/205; 523/209; 524/502; 524/524; 524/593; 524/503
[58] Field of Search .................. 523/205, 209, 208; 524/593, 502, 524

[56] References Cited

U.S. PATENT DOCUMENTS

| | | | |
|---|---|---|---|
| 3,647,743 | 3/1972 | Nagamatsu et al. ................. | 523/209 |
| 3,839,267 | 10/1974 | Golder .................................. | 524/593 |
| 3,883,468 | 5/1975 | Schmidt et al. ...................... | 524/593 |
| 3,901,846 | 8/1975 | Freed .................................... | 524/593 |
| 3,969,292 | 7/1976 | Wolters et al. ....................... | 524/593 |
| 4,126,729 | 11/1978 | Richardson et al. ................. | 524/524 |
| 4,243,580 | 1/1981 | Gale ...................................... | 524/258 |
| 4,277,577 | 7/1981 | Burg et al. ............................ | 525/400 |

FOREIGN PATENT DOCUMENTS 6919353  6/1970  Netherlands ......................... 523/209

*Primary Examiner*—John C. Bleutge
*Assistant Examiner*—Herbert J. Lilling
*Attorney, Agent, or Firm*—Maria C. H. Lin

[57] ABSTRACT

Improved polyoxymethylene molding compositions comprising fiber reinforcement such as glass, wherein the fiber reinforcement is surface treated with a vinyl polymer, such as polyvinylacetate.

10 Claims, No Drawings

FIBER REINFORCED POLYOXYMETHYLENE MOLDING COMPOSITIONS

BACKGROUND OF THE INVENTION

This invention relates to improved reinforced thermoplastic molding compositions and more particularly to fibrous reinforced polyoxymethylene molding compositions.

As is well known, polyoxymethylene, or polyacetal, is a thermoplastic resin which finds wide utility in the manufacture of molded articles. Molded articles of exceptional strength and toughness are obtained when the polyoxymethylene resin is intimately combined with various reinforcing agents.

In the past, however, it has been found that various additives are required to provide the desired physical properties to the molded article prepared from the reinforced polyoxymethylene polymers. Inferior physical properties commonly can be traced to poor adhesion between the polymer and the fibrous reinforcement.

Thus, for example, U.S. Pat. Nos. 3,542,722, 3,883,468 and 3,963,668 disclose polyoxymethylene resins filled with glass fibers which have been treated with adhesion promoting organosilicone materials.

U.S. Pat. No. 3,647,743 discloses that glass reinforced polyoxymethylene polymers, having particularly improved impact strength, are provided by coating the surface of the glass-fibers with styrene type resins and then mixing with the polyoxymethylene polymer. Other glass reinforced polyacetal compositions, wherein the glass reinforcement has been coated with an epoxide group containing silane adhesion promoter are also referred to in U.S. Pat. No. 3,850,873.

Other U.S. Patents, typical of which is U.S. Pat. No. 3,455,867, disclose the use of chemical coupling agents to provide the required adhesion between the glass fibers and the polyacetal; and U.S. Pat. No. 4,111,887 discloses the utilization of a polycarbodiimide and optionally a phenoxy resin to provide an improved reinforced polyoxymethylene molding composition.

While certain satisfactory results have been achieved by these heretofore known compositions, there is still a need for further satisfactory fiber reinforced polyoxymethylene compositions with even more improved physical properties.

SUMMARY OF THE INVENTION

Accordingly, it is one object of the present invention to provide an improved reinforced polyoxymethylene molding composition.

Another object of this invention is to provide an improved reinforced polyoxymethylene molding composition capable of forming molded articles having improved physical properties.

Still another object of this invention is to provide an improved reinforced polyoxymethylene molding composition which exhibits good properties even without the need for adhesion promoting agents.

A still further object of this invention is to provide a reinforced polyoxymethylene molding composition wherein the use of adhesion promoting agents provides even further improvements.

These and other objects are accomplished herein by providing a fiber reinforced polyoxymethylene molding composition comprising the intimate admixture of a polyoxymethylene polymer and a fibrous reinforcement, wherein said fibrous reinforcement has been treated with a vinyl polymer.

DESCRIPTION OF PREFERRED EMBODIMENTS

As used herein the term "polyoxymethylene" is intended to include both homopolymers, including so-called capped homopolymers, i.e., acylated homopolymers, as well as copolymers. Such polymers which may be produced according to methods well-known in the art, have recurring —$OCH_2$—units and are typically prepared by the polymerization of anhydrous formaldehyde or by the polymerization of trioxane.

Particularly useful in this invention is polyoxymethylene copolymer having at least one chain containing recurring oxymethylene (—$OCH_2$—) units interspersed with —OR— groups in the main polymer chain where R is a divalent radical containing at least two carbon atoms directly linked to each other and positioned in the chain between the two valences with any substituents on said R radical being inert, i.e. substituents which will not induce undesirable reactions. Preferred copolymers contain from about 60 to about 99.6 mole percent of recurring oxymethylene groups. In a preferred embodiment R may be, for example, an alkylene or substituted alkylene group containing at least two carbon atoms.

Among the copolymers which are utilized in accordance with the invention are those having a structure comprising recurring units of the formula:

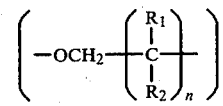

wherein n is zero or an integer of from 1 to 5, and wherein n is zero in from 60 to 99.6 percent of the recurring units. $R_1$ and $R_2$ are inert substituents, that is, substituents which will not cause undesirable reactions.

A preferred class of copolymers are those having a structure comprising recurring units wherein from 60 to 99.6 percent of the recurring units are oxymethylene units. These copolymers are prepared by copolymerizng trioxane with a cyclic ether having the structure:

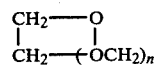

wherein n is 0, 1 or 2.

Examples of other preferred polymers include copolymers of trioxane and cyclic ethers containing at least two adjacent carbon atoms such as the copolymers disclosed in U.S. Pat. No. 3,027,352.

Among the specific ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred polymers utilized in accordance with the invention are moldable thermoplastic materials having a weight average molecular weight of at least about 35,000, a melting point of at least about 150° C., an an inherent viscosity of at least about 0.8 (measured at 60°

C. in a 0.1 weight percent solution in p-chlorophenol containing 2 weight percent of alpha-pinene).

Commonly, the polyoxymethylene polymer is prestabilized to a substantial degree. Such stabilization may take the form of stabilization by degradation of the molecular ends of the polymer chain to a point where a relatively stable carbon-to-carbon linkage exists at each end. For example, such degradation may be effected by melt hydrolysis such as that disclosed in U.S. Pat. No. 3,318,848, or by solution hydrolysis such as that described in U.S. Pat. No. 3,219,623. Mixtures of polyoxymethylene polymers stabilized by melt hydrolysis and by solution hydrolysis may, of course, be used. The polyoxymethylene may also include conventional stabilizers such as an antioxidant and/or an acid scavenger. Generally, these stabilizers will be present in a total amount of less than about 3 percent by weight based on the weight of the polyoxymethylene polymer.

The types of fibrous reinforcements which are utilized in the practice of the present invention are those generally known in the art for reinforcing thermoplastic molding resins and include among others glass fibers (chopped, strand, or continuous rovings), asbestos fibers, cellulosic fibers and synthetic fibers such as graphite fibers.

In order to realize the specific improvements of this invention, the surface of the fibrous reinforcements utilized herein must be treated with a vinyl polymer, such as, for example, polyvinylacetate, copolymers of vinyl acetate and other ethylenically unsaturated monomers such as ethylenevinyl acetate and partially hydrolyzed vinyl acetate polymer. Best results are achieved with glass fiber reinforcement wherein the glass fibers have been treated with polyvinyl acetate. One such material is commercially available and is known as Nittobo CS 3PE-231P glass sold by Nittobo Corp. of Japan.

In another embodiment of the present invention, even further improved thermoplastic reinforced polyoxymethylene compositions are provided by the incorporation of a coupling agent. i.e., an adhesion promoter, such as, for example, certain high molecular weight phenoxy resins, methylene diphenyldiisocyanate (MDI), into the heretofore described fibrous reinforced compositions.

Phenoxy resins which may be utilized herein are, for example, those described in U.S. Pat. No. 3,901,846. These resins are high molecular weight thermoplastic resins which are produced from 2,2'-bis(4-hydroxyphenyl) propane and epichlorohydrin according to the procedure as described in U.S. Pat. No. 3,356,646. The basic chemical structure of the phenoxy resins is similar to that of epoxy resins. They are, however, a separate and unique resin class, differing from epoxies in several important characteristics:

1. Phenoxy resins are tough and ductile thermoplastics. Their weight average molecular weight ranges from about 15,000 to 75,000, preferably from about 20,000 to 50,000 compared with 340 to 13,000 for conventional epoxies which crosslink on polymerization.

2. Phenoxy resins do not have terminal highly reactive epoxy groups and are thermally stable materials with a long shelf life.

3. The phenoxy resins can be used without further chemical conversion. They require no catalysts, curing agents or hardeners to be useful products while epoxy resins require catalysts, curing agents or hardeners to be useful.

The phenoxy resins utilized herein can be characterized by a repeating structure:

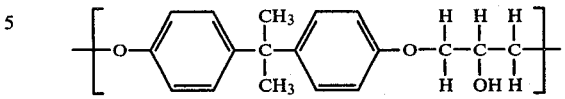

and have a weight average molecular weight range from about 15,000 to 75,000. As is obvious, the terminal structure is completed with hydrogen atoms or some suitable end capping groups.

The phenoxy resin or other coupling agents described hereinbefore are typically incorporated in the reinforced polyoxymethylene compositions in an amount of from about 0.01 to 5.0 percent by weight based on the weight of the total composition, and more typically in an amount of from about 0.1 to 1.0 percent by weight based upon the total composition.

The polyoxymethylene, fibrous reinforcement and, in the second aspect of the invention, the coupling agent such as the phenoxy resin, may be mixed or blended in any convenient manner. Thus, for example, in a preferred embodiment, the phenoxy resin may be simultaneously intimately mixed with the reinforcing agent and the oxymethylene polymer. Mixing time involving the fibrous reinforcement should be kept to a minimum so as to avoid attrition of the fibrous reinforcement. For instance, mixing of all components may satisfactorily be carried out for 0.5 to 3 minutes (e.g. 1 to 2 minutes) while the components are present in an extruder provided at a melt temperature of about 400° to 405° F.

The reinforced polyoxymethylene molding compositions of the invention, in addition to the polyoxymethylene polymer, reinforcing agent and, if desired, a coupling agent optionally may also include a minor quantity of additives conventionally employed in non-reinforced or reinforced polyoxymethylene molding compositions both polymeric and non-polymeric, such as impact modifiers, for example, Elvax (polyvinylacetate), lubricity agents, dyes, and conventional antioxidants and acid scavengers.

A typical molding composition to which the additives according to the present invention are added may comprise, for example: 40 to 95 percent by weight polyoxymethylene, 5 to 60 percent by weight surface treated fiber reinforcement, such as glas, 0.05 to 2.0 percent by weight antioxidant, and 0.05 to 2.0 percent by weight acid scavenger. A preferred composition which, may be modified, according to the invention includes 60 to 90 percent by weight polyoxymethylene polymer, 10 to 40 percent by weight surface treated glass fiber, 0.1 to 1.0 percent by weight antioxidant, and 0.1 to 1.0 percent by weight acid scavenger. For instance, 74 parts by weight of a polyoxymethylene resin which incorporates 0.4 parts antioxidant and 0.1 part acid scavenger can be mixed with 25.0 parts of glass fiber or 64 parts by weight of a polyoxymethylene resin which incorporates 0.4 part antioxidant and 0.1 part acid scavenger can be mixed with 35.0 parts glass fiber, and 0.2 parts by weight of the phenoxy resin. The exact composition chosen, however, will be dependent on the desired properties of the molded article as will be apparent to one of ordinary skill in the art.

Molded articles prepared from the thermoplastic reinforced polyoxymethylene molding compositions according to this invention show a distinct improvement in physical properties as compared to articles prepared from fiber reinforced polyoxymethylene which do not contain the surface treated fibrous reinforcement as disclosed herein.

In order that the skilled in the art may better understand how the present invention is practiced, the following examples are given by way of illustration and not by way of limitation.

EXAMPLES 1–4

The blends shown in the following Table are prepared by feeding the ingredients to a single screw extruder and compounding them at a melt temperature of about 400° F. The various compositions are thereafter molded, also at a melt temperature of about 400° F., into tensile bars in a conventional molding apparatus.

The polyoxymethylene polymer employed in Examples 1–4 is a polyoxymethylene copolymer prepared from trioxane and ethylene oxide and has an average molecular weight of approximately 35,000. The polyether surface treated glass, i.e. under the designation OCF 409BB, are glass fibers in the form of chopped strands having a length of 3/16 inch and a diameter of 50 to $55 \times 10^{-5}$ inch, sold commercially by Owens-Corning Figerglas Corp. The Nittobo glass, sold by Nittobo Corporation, is in the form of chopped strands and is fiberglass which has been surface treated with polyvinyl acetate. The phenoxy ingredient is a thermoplastic phenoxy resin prepared from epichlorohydrin and 2,2-bis(4-hydroxyphenyl) propane having a weight average molecular weight of about 30,000. The stabilizer is a mixture of 0.4 percent 2,2'-methylene-bis-(4-methyl-6-tertiary-butylphenol) antioxidant and 0.1 percent cyanoguanidine acid scavenger. The physical properties of the moldings which are prepared from the blends are included in the table.

invention which are within the full extended scope of the invention as defined by the appended claims.

What is claimed is:

1. An improved fiber reinforced polyoxymethylene molding composition comprising the admixture of:
    (i) a polyoxymethylene polymer; and
    (ii) an effective amount of a fibrous reinforcement, wherein said fibrous reinforcement is surface treated with a vinyl polymer which is selected from the group consisting of polyvinylacetate, copolymers of vinyl acetate and other ethylenically unsaturated monomers and partially hydrolyzed vinyl acetate polymer.

2. The composition according to claim 1 wherein said fibrous reinforcement is glass.

3. The composition according to claim 1 wherein the fibrous reinforcement is present in an amount of from about 5 to about 60 percent by weight of the total composition.

4. The composition of claim 1 wherein the polyoxymethylene polymer has an inherent viscosity of at least 0.8 (measured at 60° C. in a 0.1 weight percent solution in p-chlorophenol containing 2 weight percent of alpha-pinene), a weight average molecular weight of at least 35,000 and a melting point of at least 150° C.

5. The composition of claim 1 which further includes a high molecular weight thermoplastic phenoxy resin.

6. The composition of claim 1 which is stabilized by the addition of an antioxidant and an acid scavenger.

7. The composition of claim 4 wherein the phenoxy resin has the repeating structure:

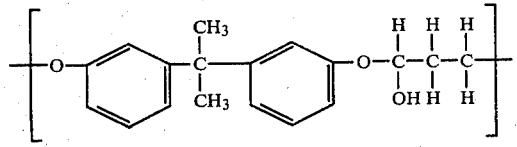

TABLE I

| Compositions | Example (1) | Example (2) | Example (3) | Example (4) |
|---|---|---|---|---|
| Polyoxymethylene (Celcon M90) | 74.1% | 74.3% | 61.1% | 74.1 |
| OCF Glass (409 BB) | 25% | — | — | — |
| Nittobo Glass (CS3PE231P) | — | 25% | 35% | 25% |
| Phenoxy (PKHH) | 0.2% | — | 0.2% | 0.2% |
| Elvax 150 (polyvinylacetate, sold by DuPont) | — | — | 3% | — |
| Stabilizer | 0.5% | 0.5% | 0.5% | 0.5% |
| Acrawax C (N,N'—ethylene-bis-stearamide) sold by Glyco Chemicals, Inc. | 0.2% | 0.2% | 0.2% | 0.2% |
| Mechanical Properties | | | | |
| Tensile Strength (psi) | 13,100 | 17,700 | 20,300 | 17,000 |
| Notched Izod (ft-lb/in) | 0.86 | 1.44 | 2.14 | 1.5 |
| Elongation (%) @ break | 1.8 | 3.0 | 3.0 | — |

The data in the above Table clearly show that polyoxymethylene molding compositions containing polyvinyl acetate surface treated fibrous reinforcement, according to this invention, have superior physical properties compared with the same or similar compositions but for employing polyether surface treated fibrous reinforcement, e.g., OCF 409BB.

Obviously, other modifications and variations of the present invention are possible in the light of the above teachings. It is, therefore, to be understood that changes may be made in the particular embodiments of this and a weight average molecular weight of from about 15,000 to 75,000.

8. The composition of claim 6 wherein the antioxidant is 2,2'-methylene-bis-(4-methyl-6-tertiary-butylphenol) and said acid scavenger is cyanoguanidine.

9. A fiber reinforced molded polyoxymethylene composite article exhibiting improved physical properties formed from the molding composition of claim 1.

10. The composition of claim 1 which further includes as an impact modifier a vinyl acetate resin.

* * * * *